United States Patent [19]

Chamussy

[11] Patent Number: 5,517,853
[45] Date of Patent: May 21, 1996

[54] PROCESS FOR USING SIGNALS IN A TIRE MONITORING SYSTEM TO DETERMINE REINFLATION

[75] Inventor: Jean-Francois Chamussy, Blois, France

[73] Assignee: Compagnie Generale des Establissements Michelin-Michelin et Cie, Clermont-Ferrand, France

[21] Appl. No.: 194,678

[22] Filed: Feb. 14, 1994

[30] Foreign Application Priority Data

Feb. 11, 1993 [FR] France ................. 93 01806

[51] Int. Cl.⁶ ................. B60C 23/02
[52] U.S. Cl. ................. 73/146.3; 340/442
[58] Field of Search ................. 73/146.3; 340/442

[56] References Cited

U.S. PATENT DOCUMENTS 5,239,469  8/1993  Walker et al. ............. 340/422 X
5,345,217  9/1994  Prottey ................. 340/422

FOREIGN PATENT DOCUMENTS 0284895  10/1988  European Pat. Off. .
2680135  2/1993  France .

Primary Examiner—Richard Chilcot
Assistant Examiner—Joseph L. Felber
Attorney, Agent, or Firm—Russell W. Warnock; Robert R. Reed

[57]  ABSTRACT

The present invention provides a method for monitoring the pressure of tires in accordance with which a tire monitoring system operates according to a normal mode of detecting flats and under-inflation and according to an assistance mode when reinflating the tires. The switch between the two modes does not require any intervention by the user: through detection of an increase of the inflation pressure in a tire, it can be deduced that the tire in question is in the process of reinflation.

9 Claims, 1 Drawing Sheet

PROCESS FOR USING SIGNALS IN A TIRE MONITORING SYSTEM TO DETERMINE REINFLATION

BACKGROUND OF THE INVENTION

The present invention relates to a method for monitoring tires. More particularly, the present invention relates to a method for use in a tire monitoring system in which measurements are taken on the tires with the view of providing the fullest possible assistance to the driver of a vehicle having such a system.

The primary aim of tire monitoring systems is to alert the driver of any anomaly which could occur to the tires, or to one of these tires. For that, it is impossible to be satisfied with displaying the pressure values, and the temperature if necessary, measured in the tires. Permanent consultation of these indications risks being tiresome, and especially their interpretation by the driver remains very problematic because these measurements are influenced by various disturbances such as heat build-up in the tire during operation. This is why a processor takes charge of global use of signals, according to a suitable processing program to give an alert to the driver when one of his tires, or several among them, are no longer in a normal state of operation, or even entering into a dangerous area for the safety of using the vehicle.

The aim of the present invention is to be able not only to ensure the "alert" function in case of failure, but also to be able to provide assistance when the tires are reinflated one after the other during a periodic maintenance operation, in an inflation station or even using a portable air pump. In this case, quite often, the operator does not have a chart available giving the inflation pressures of the vehicle concerned. Even if he has a tire pressure monitoring system available, it does not necessarily inform the operator of the nominal pressure values. It is burdensome to require the operator to proceed with successive adjustments by consulting the indications provided on the dashboard by the tire monitoring system between each adjustment.

It has been proposed to use a tire monitoring system to provide the operator with assistance with reinflation. For example, the driver may be asked to indicate to the system, through an appropriate command on the dashboard for example, that one is going to proceed with reinflation. Alternatively, a sensor, on, for example, the valve, may allow for detecting the use of an air pump, as proposed in the patent application EP 0 284 895. However, the need still exists for a method of automatically determining that a tire of a vehicle is undergoing reinflation so that, through appropriate configuration of a tire monitoring system, the vehicle driver is automatically alerted that the tire is undergoing reinflation.

SUMMARY OF THE INVENTION

According to a preferred embodiment of the method of the present invention, in a process for using signals in a tire monitoring system of a vehicle in which the said system delivers a measurement of the inflation pressure P of each tire, the monitoring system having a normal operating mode consisting of giving the driver of the vehicle an alert when the pressure of one of the tires is no longer considered normal, and a reinflation assistance operating mode, there is provided at any instant t, the following steps:

a) a filtered value $P_F$ is calculated from P, representative of the prior conditions of the tire existing before the instant t, b) P is compared to $P_F$, c) it is detected that the tire observed is in the process of reinflation if the absolute value of $P-P_F$ is greater than a threshold value determined experimentally and the switch is done automatically to the reinflation assistance operating mode for the tire considered.

Based on the observation that, because of leaks or porosity of materials, a tire can only lose air, a monitoring system can be provided in accordance with the present invention capable of switching automatically from a normal operating mode to a reinflation assistance operating mode when the start of reinflation is detected. This switch is not only automatic, it is spontaneous, since it only uses its own knowledge of the condition of the tires, without requiring recourse to additional specific information of the reinflation situation.

To this end, such a monitoring system is preferably based on the measurement of the pressure recorded on the inside of each tire. This can increase following heat build-up in the tire, and not only when the tire is being reinflated. But the period of time of heat build-up, a thermic/temperature phenomenon, is relatively much larger than the period of time of reinflation, even in the case where manual air pumps are used with low flow rate. Reinflation can thus be distinguished from heat build-up in a very reliable way by using a discriminating filter.

A monitoring system thus conceived permits not only the provision of assistance to the driver when he desires to effectively reinflate his tires, but it also permits the driver to be alerted. For example, when the driver, having rotated tires on a vehicle having different inflation pressures on the front and the rear, he forgets to readjust the pressures. In this case, on one of the axles at least, the system will detect a non-natural evolution, meaning a reinflation, and the person who did the rotation, or the driver, will be able to be alerted by the automatic switch to reinflation assistance mode. Also, when the spare wheel is installed after a flat, the system will automatically switch to reinflation assistance mode, and generally will give an overinflation alarm since the spare wheel should always be inflated to a pressure higher than the highest nominal pressure of the tires of each axle.

DETAILED DESCRIPTION OF THE PREFERRED EMBODIMENT

Figure 1:
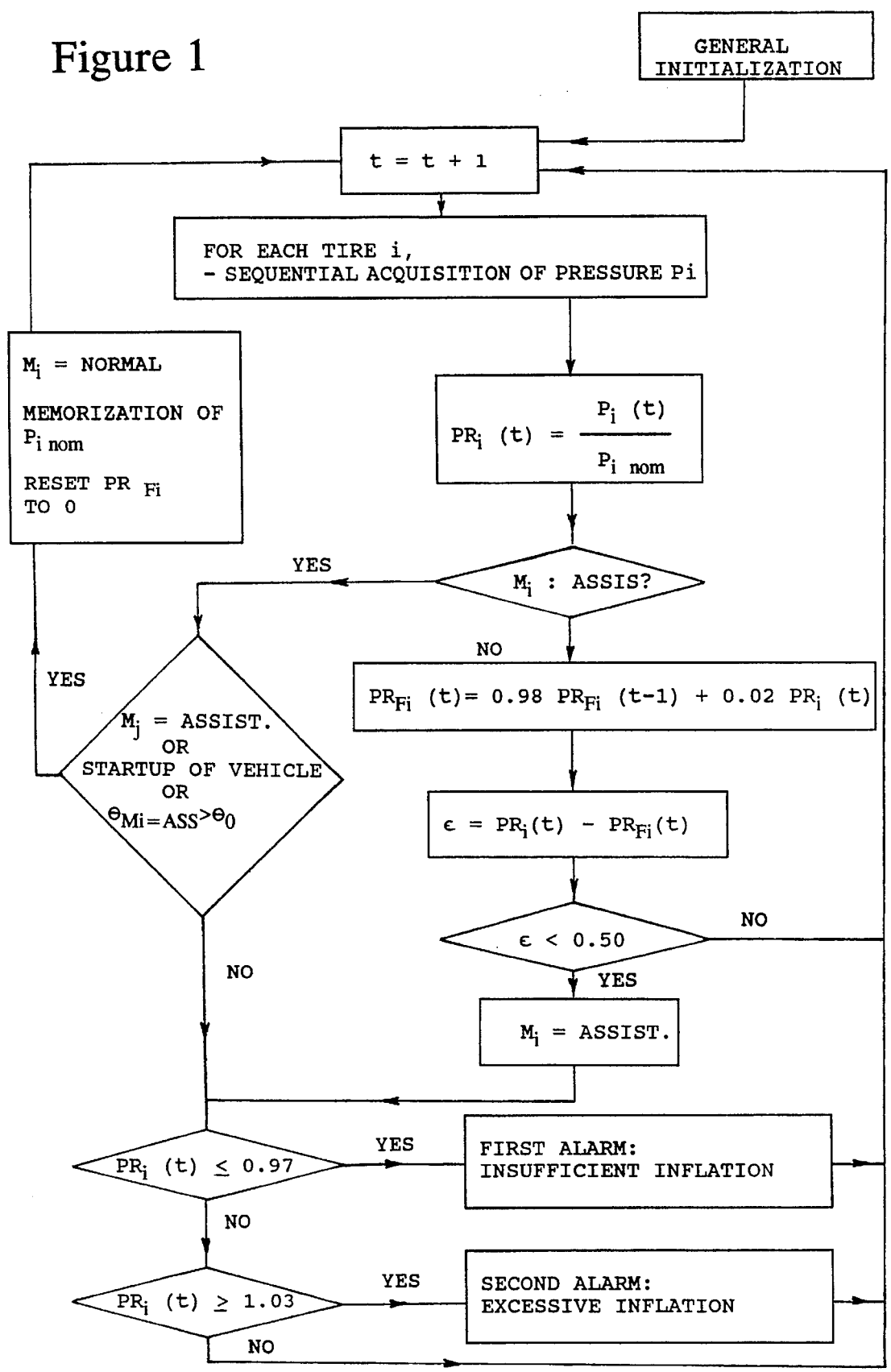
FIG. 1, is a schematic representation in the form of a flow chart of the steps of the preferred embodiment of the method of the present invention.

Knowing for each tire i the nominal inflation pressure $P_{i\,nom}$, one can construct a dimensionless value:

$$PR_i(t) = \frac{P_i(t)}{P_{i\,nom}}$$

where $P_i(t)$ is a value representative of the actual pressure of a tire i at a selected time interval (t).

It is necessary to construct a filter which smoothes or erases all of the fluctuations of values $PR_i(t)$ based on the measurements $P_i(t)$. The filtering characteristics of this filter should take into account the history of prior conditions of the inflation pressure of the tire being observed. Therefore, for each tire i, a filtered value $P_{Fi}$ (or $PR_{Fi}$ if a dimensionless value is used) can be calculated which incorporates a representation of prior conditions of the tire's inflation, preferably since the last reinflation, and which can thus be regarded as a periodically updated reference value. This filtered value is calculated as follows:

$$PR_{Fi}(t)=K_1PR_{Fi}(t-1)+K_2PR_i(t) \text{ with } K_1+K_2=1$$

where:

$PR_{Fi}(t)$= the dimensionless filtered value (the periodically updated reference value)

$PR_{Fi}(t)$=the previous reference value, which represented the prior condition of the tire at a previous time interval $t-1$.

Immediately after a readjustment of pressure, the system is initialized by adopting $PR_{Fi}(t-1)=1$ as the initial filtered value. Then, this filtered value calculated for all following cycles of observation allows for a reference to be given which is adapted to the true status of the inflation pressure, that is to say which can follow rather slow variations due to thermic/temperature phenomena, but will not follow a rapid variation due to a reinflation. The determination that reinflation is occurring involves discovering that the selected time interval value $PR_i(t)$ has deviated excessively from the filtered value $PR_{Fi}(t)$. Through experimentation, a threshold value $\epsilon$ may be chosen against which the deviation can compared with the threshold value $\epsilon$ being high enough to take account of deviations due to thermic/temperature causes, and being low enough to allow detection of the reinflation very soon after it has started. Specifically, it can be determined that the tire is undergoing reinflation if the deviation $[PR_i(t)-PR_{Fi}(t)]$ exceeds a value selected for the threshold value $\epsilon$.

The experiments done have shown that the values $K_1=0.9$ and $K_2=0.1$ give excellent results. However, in a given situation, the values $K_1+K_2$ may be outside these preferred values. For example, the values can be set at $K_1=0.98$ and $K_2=0.02$, as illustrated in FIG. 1, it being noted that the values $K_1$ and $K_2$ may be optimally different for some tire monitoring situations than in other tire monitoring situations. The sensitivity of the filter, that is to say, the speed of reaction from the moment when reinflation has effectively started, depends on the flow of air blown into the tire. The proposed filter is an excellent compromise allowing use of high flow reinflation stations as well as manual pumps. It is appropriate to decrease the weight $K_1$ because, among other reasons, the flow from the reinflation pump is high. The values of $K_1=0.99$ and $K_2=0.01$ can also be appropriate. In this last case, with a selected time interval t of about 0.75 seconds, the system will detect a reinflation condition in no more than 2 or 3 seconds.

In reinflation assistance, one cannot be satisfied with reusing the same margin of monitoring the air pressure as that used by the same system when it is operating in normal mode. During reinflation, it is often desirable to respect a relatively more narrow tolerance margin (for example, ±3%) closely surrounding the nominal value, which possibly takes into account the operating conditions of the vehicle (possible load sensor, for example) while, in normal mode, a greater loss of air can be tolerated (for example, −15% relative to the normal pressure).

The proposed reinflation assistance preferably includes providing an initial alarm while the measured pressure $P_i(t)$ is lower than a minimum threshold $P_{i\ min}$ as seen in FIG. 1 and providing a second alarm distinct from the first when the measured pressure $P_i(t)$ is higher than a maximum threshold $P_{i\ max}$.

Based on the assumption that the operator is outside of the vehicle, the first alarm activates, for example, a noise in a continuous manner, and the second alarm activates the same noise in a discontinuous manner. The operator knows that he must reinflate as long as the noise is not shut off, and at the latest until the noise operates in a discontinuous manner. To communicate the necessary instruction to the user, one can also configure the system to illuminate the electric bulb of the turn signal closest to the tire considered.

With the usual air pump station, the flow of air is lower when the tire is being deflated than when it is being inflated. So, an efficient way of using the system consists in inflating the tire until the second higher alarm activates, then slowly deflating the tire until the alarm stops.

Other verification tests can be conducted to improve the reliability of the automatic passage from the normal mode to reinflation assistance mode. For example, after having determined that the absolute value of $PR_i(t)-PR_{Fi}(t)$ is greater than $\epsilon$, it can be verified that the same test indeed gives a value which remains less than $\epsilon$ for all of the other tires of the vehicle, because it is assumed that the user can reinflate only one of his tires at a time.

It has just been explained how the system is capable of automatically switching to an inflation assistance mode (e.g., the mode in which the tire is undergoing reinflation) for a given tire. That is symbolized by the condition $M_i$=Assis. on the diagram of the attached FIG. 1. It is now necessary to establish the conditions to be met for the system to automatically leave this assistance mode for the tire i. For example, the system may be configured to automatically switch out of an inflation mode if one of the following three conditions exist:

1) a switch to an assistance mode for another tire j: $M_j$=assist.;
2) a long period of time $\theta_{Mi}$ in assistance mode without air supply on the same tire: $\theta_{Mi=Assistance}>\theta_o$, $\theta_o$ being a preestablished threshold duration; and
3) start-up of the vehicle:for example prompting from the starter or, preferably, from information obtained from a speed sensor.

When at least one of these conditions is met, the system switches to normal mode for the tire i, which is illustrated by the switch in mode $M_i$= Normal on the attached FIG. 1.

Additionally, after the system has automatically switched to the normal mode $M_i$=Normal, the new reference value for the tire i is memorized (Memorization of $P_{i\ nom}$) and the filter $PR_{Fi}$ is reinitialized by erasing the history. The filter conventionally takes the value 1 ($PR_{Fi}$ reset to zero).

If the monitoring system uses electrical energy, it may be provided that it is automatically turned off when the engine is not operating. If a reinflation assistance mode as proposed by the present invention is incorporated in the system, it is then necessary that the system can operate when the vehicle ignition key is in a position other than the engine-off position. Preferably, the data relative to the history of the tires is stored in non-volatile (static) memory.

I claim:

1. A method of determining that a tire of a vehicle is undergoing reinflation as opposed to experiencing an out-of-limits tire pressure condition requiring remedial action, the vehicle being of the type having a tire monitoring system alerting the driver to an out-of-limits tire pressure condition comprising:

comparing a selected time interval value representative of the actual pressure in the tire at a selected time interval t with a periodically updated reference value of the tire pressure, the periodically updated reference value varying as a function of pressure conditions in the tire prior to the selected time interval t; and determining that the tire is undergoing reinflation if the difference between the selected time interval value and the periodically updated reference value exceeds a threshold value.

2. A method of determining that a tire of a vehicle is undergoing reinflation according to claim 1 wherein the tire monitoring system operates in a normal operating mode in which it alerts a vehicle driver that the pressure in a tire is out-of-limits and a reinflation assistance mode in which it monitors a tire during reinflation thereof and further comprising switching the tire monitoring system automatically from its normal operating mode to its reinflation assistance mode in response to a determination that the tire is undergoing reinflation.

3. A method of determining that a tire of a vehicle is undergoing reinflation according to claim 1 and further comprising obtaining the selected time interval value by measuring the actual pressure of the tire at the selected time interval t, comparing the actual measured tire pressure and a nominal tire pressure with one another in a ratio manner, and expressing the selected time interval value as a ratio.

4. A method of determining that a tire of a vehicle is undergoing reinflation according to claim 1 and further comprising periodically obtaining values each representing the actual tire pressure at a respective time interval prior to the selected time interval t and periodically updating the periodically updated reference value to a new value in a manner which takes into account the values obtained since the most recent periodic updating of the periodically updated reference value.

5. A method of determining that a tire of a vehicle is undergoing reinflation according to claim 4 and characterized further in that periodically updating the periodically updated reference value includes calculating the periodically updated reference value according to the following formula:

$$P_F(t) = K_1 P_F(t-1) + K_2 P(t)$$

where $P_F(t)$ is the periodically updated reference value, at said selected time interval t $P_F(t-1)$ is a prior value representing the periodically updated reference value at the time interval t−1, P(t) is the actual tire pressure at said selected time interval, and $K_1$ and $K_2$ are each weighting factors.

6. A method of determining that a tire of a vehicle is undergoing reinflation according to claim 5 and characterized further in that calculating the periodically updated reference value include setting the sum of $K_1$ and $K_2$ being equal to the value of one.

7. A method of determining that a tire of a vehicle is undergoing reinflation according to claim 1 and further comprising activating a lower limit alarm if the selected time interval value is less than a lower absolute pressure limit and activating an upper limit alarm if the selected time interval value is greater than an upper absolute pressure limit.

8. A method of determining that a tire of a vehicle is undergoing reinflation according to claim 1 and further comprising providing a respective, periodically updated reference value for each of the other tires of the vehicle, comparing the selected time interval value of each respective tire with its respective reference value, and determining that a tire is undergoing reinflation only if the difference between the selected time interval value and the periodically updated reference value is higher than the respective threshold value of the tires of the vehicle.

9. A method of determining that a tire of a vehicle is undergoing reinflation according to claim 1 and further comprising determining that the tire is no longer undergoing reinflation in response to the occurrence or non-occurrence of a predetermined condition.

* * * * *